United States Patent [19]

Zweegers

[11] 4,304,087
[45] Dec. 8, 1981

[54] AGRICULTURAL IMPLEMENT

[76] Inventor: Petrus W. Zweegers, Nieuwendijk 46, Geldrop, Netherlands

[21] Appl. No.: 164,968

[22] Filed: Jul. 1, 1980

[30] Foreign Application Priority Data

May 7, 1979 [NL] Netherlands ............ 7905254

[51] Int. Cl.³ ........................................... A01D 75/18
[52] U.S. Cl. ........................................ 56/10.4; 56/15.7
[58] Field of Search ............. 56/10.4, 15.3, 15.7; 172/38, 233, 234, 235

[56] References Cited

U.S. PATENT DOCUMENTS

| | | | |
|---|---|---|---|
| 2,932,933 | 4/1960 | Elfes et al. | 56/10.4 |
| 3,257,789 | 6/1966 | Carlson | 56/10.4 |
| 3,543,489 | 12/1970 | Maier et al. | 56/10.4 |
| 3,545,184 | 12/1970 | Liepold et al. | 56/10.4 |
| 3,721,074 | 3/1973 | Heth | 56/10.4 |
| 4,183,195 | 1/1980 | James | 56/10.4 |

*Primary Examiner*—Paul J. Hirsch
*Attorney, Agent, or Firm*—Edmund M. Jaskiewicz

[57] ABSTRACT

An agricultural implement has a first frame portion for coupling to a tractor and a second frame portion has one end pivotally connected to the first frame portion. The pivotal connection is such that the second frame portion will pivot with respect to the first frame portion only when a force exerted on the second frame portion exceeds a pre-determined magnitude. A carrier, upon which are mounted working tools, is pivotally connected to the other end of the second frame portion and there is a spring device between the carrier and the second frame portion. This spring device exerts such a force that the outer end portion of the carrier can only pivot in the direction of normal operation of the implement.

4 Claims, 3 Drawing Figures

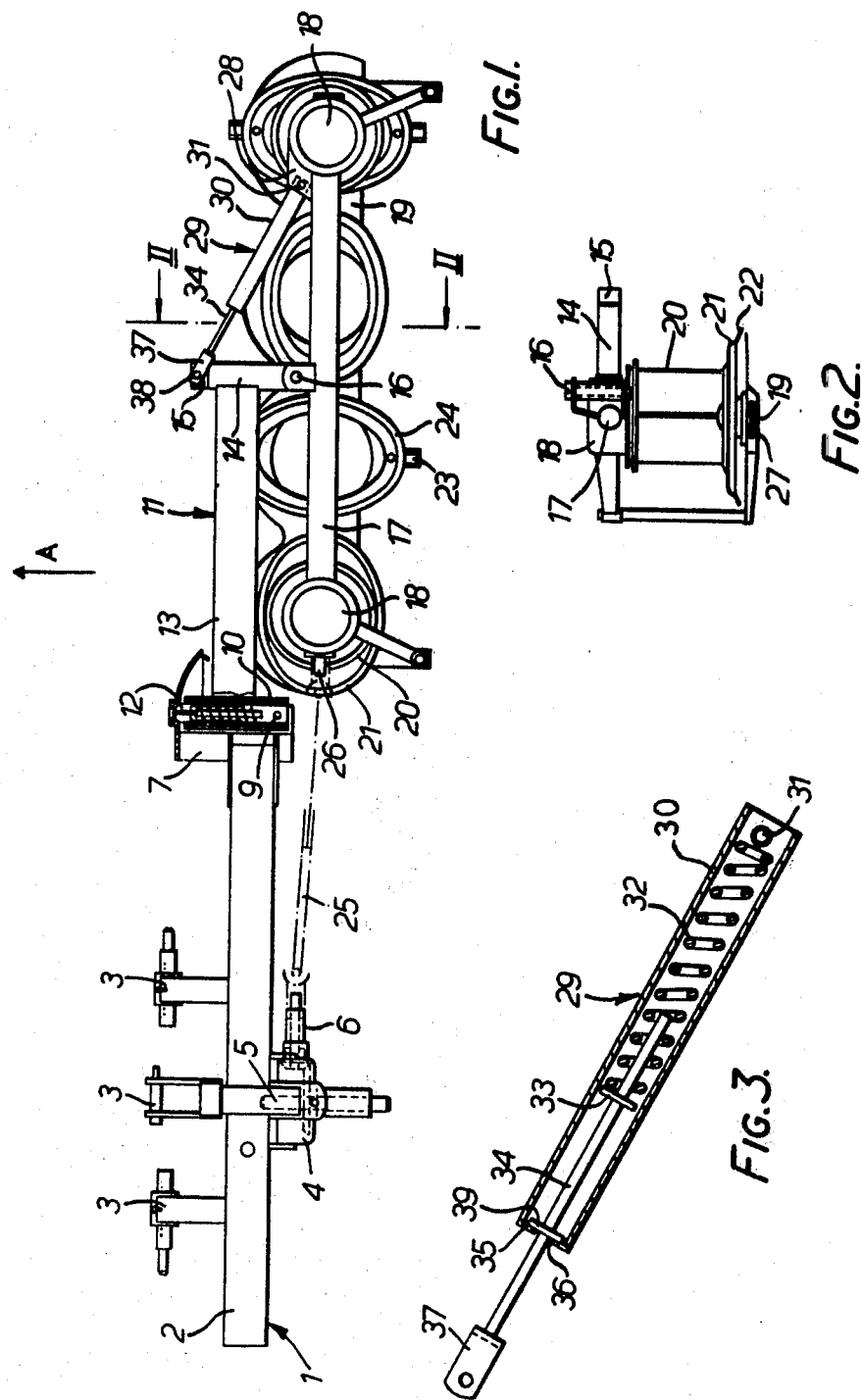

AGRICULTURAL IMPLEMENT

The invention relates to an agricultural implement comprising a first frame portion having coupling members for hitching the implement to an agricultural tractor or the like and a second frame portion carrying working tools and being pivotable about an vertically extending pivotal shaft located near one end of said second frame portion with respect to the first frame portion. Near the pivotal shaft means there is provided a construction such that the second frame portion will turn with respect to the first frame portion only when a force exerted on the second frame portion exceeds a given value.

Such agricultural implements are generally known. If the second frame portion collides with an obstacle or the like on the field during operation, this second frame portion can deflect to the rear with respect to the first frame portion coupled with a tractor or the like in order to avoid damage of the implement. In practice, however, it has been found that if the second frame portion strikes an obstacle at a point located relatively close to the upwardly extending pivotal shaft the second frame portion is not likely to turn in the desired manner with respect to the first frame portion about the upwardly extending pivotal shaft. As a result, the inertia forces produced may deform the second frame portion.

The object of the present invention to provide an agricultural implement of the kind in which the above described disadvantage of the known agricultural implements of this type can be avoided.

According to the invention this object can be achieved in that the working tools are secured to a carrier which is pivotable about a second pivotal shaft similarly extending vertically and being located at a given distance from the first pivotal shaft with respect to the further part of the second frame portion in a manner such that, viewed in the direction of movement during operation, the part of the carrier of the working tools located on the side of the second pivotal shaft remote from the first pivotal shaft is capable of turning forwardly against the force of a spring mechanism.

If the second frame portion strikes an obstacle at a point located relatively near the first pivotal shaft, the carrier of the working members can deflect under the action of the exerted inertia forces against the effect of the spring mechanism, according to the present invention, so that undesirable damage of the agricultural implement can be avoided.

The invention will be described more fully hereinafter with reference to an embodiment shown schematically in the accompanying Figures of a device in accordance with the invention.

FIG. 1 is a schematic plan view of an agricultural implement in accordance with the invention.

FIG. 2 is a schematic sectional view taken on the line II—II in FIG. 1.

FIG. 3 illustrates on an enlarged scale the spring mechanism used in the device shown in FIGS. 1 and 2.

By way of example of an agricultural implement in which the construction according to the present invention can be employed the Figures show an agricultural implement in the form of a mower of the kind described in prior Dutch Patent Application 7,805,731. The implement shown comprises a first frame portion 1 to be coupled with a tractor or the like and having a horizontal, hollow frame beam extending transversely of the direction of movement of the mower and provided with connecting members 3 known per se for coupling the mower with the lifting device of a tractor. To the frame beam 2 is furthermore fastened a gear box 4 having an input shaft 5 adapted in a conventional manner to be coupled with the power take-off shaft of a tractor or the like with the aid of an auxiliary shaft and an output shaft 6 through which can be driven cutting discs of the mower to be described more fully hereinafter.

To one end of the frame beam 2 is secured a support 7, to which is coupled a coupling member 10 by means of a vertical shaft 9. The coupling member 10 connects a second frame portion 11 with the first frame portion 1 so as to be pivotable about the vertical shaft 9. The two frame portions 1 and 11 are retained in the normal operating position shown in FIG. 1 against rotation about the shaft 9 with the aid of a spring-loaded locking mechanism 12, which is constructed so that, if during operation the second frame portion 11 is subjected to a given force in a direction opposite to the intended direction of movement during operation in the direction of the arrow A, the frame portion 11 can turn rearwardly about the shaft 9 upon overcoming the locking force exerted by the locking mechanism 12.

The second frame portion 11 comprises a frame beam 13, one end of which is fastened to the coupling member 10. The other end has secured to it a horizontal sleeve 14 extending at right angles to the beam 11 and rotatably accommodating a shaft 15 projecting out of both sides of the sleeve. With the aid of a vertical pivotal shaft 16 the rear end of the shaft 15 has coupled to it a frame beam 17 extending in normal operation parallel to the frame beam 13, viewed in plan. Gear boxes 18 are arranged one at each end of the frame beam 17. In these gear boxes are journalled the top ends of downwardly extending shafts, the lower ends of which are supported by a hollow, flat casing 19 extending parallel to the frame beam 17. These shafts are surrounded by drum 20 fastened to the shafts the bottom sides of which are provided with cutting discs 21 having knives 22. Between the cutting discs located near the ends of the casing 19 additional cutting discs 24 provided with knives 23 are arranged above the casing.

The cutting discs can be driven from the output shaft 6 with the aid of an auxiliary shaft 25 shown schematically in FIG. 1 and being coupled with a shaft 26 emerging from one of the gear boxes 18. The pinion transmissions accommodated in the gear boxes 18 are intercoupled by means of a shaft located in the frame beam 17. The cutting discs 24 are furthermore coupled with one of the cutting discs 21 by pinions 27 located in the gear box 19.

A spring mechanism 29 is arranged between the end of the shaft 15 projecting in front of the sleeve 14 and a support 28 fastened to the gear box furthest to the right as seen in FIG. 1. FIG. 3 shows in detail that the spring mechanism 29 comprises a sleeve 30, which is pivotally coupled with the support 28 by a pin 31 extending parallel to the pivotal shaft 16. The sleeve 30 holds a compression spring 32, which is locked with bias tension between the pin 31 and a dish 33 fastened to a rod 34, the centre line of which at least substantially coincides with the centre line of the sleeve 30 and which projects out of the sleeve at the end of the sleeve 30 remote from the pin 31 through a hole 36 in a head wall 35 closing one end of the sleeve 30. To the free end of the rod 34 located outside the sleeve is fastened a U-shaped bracket 37, with the aid of which the end concerned of the rod 34 is pivoted to the end of the shaft 15 projecting in front of the sleeve 14 by means of a pin 38 extending parallel to the pin 31.

At a given distance from the dish 33 the rod 34 is provided with an additional dish 39, which serves as a stop co-operating with the head wall 35 of the sleeve. The construction is such that in normal operation the frame beam 17, viewed in plan (FIG. 1), extends at least substantially parallel to the frame beams 2 and 13 extending transversely of the direction of movement, the dish 39 is in engagement with the head wall 35 of the sleeve 30 and the spring 32 is biassed to the desired extent.

If as usual in normal operation the device is moved in the direction indicated by the arrow A and the second frame portion 11 collides with an obstacle, the frame portion will normally turn about the pivotal shaft 9 to the rear opposite the direction of movement after overcoming the effort exerted by the locking mechanism 12.

However, if the frame portion 11 strikes an obstacle at a point located relatively near the pivotal shaft 9, it may occur that the torque produced by the force exerted on the frame portion 11 is too low for causing a pivoting about the pivotal shaft 9 after the locking effort of the locking mechanism 12 has been overcome. With the constructions previously employed it may then occur, however, that as a result of the inertia forces thus produced the frame portion 11 may be damaged. For example, the frame beam 13 may be deformed when the frame beam 13 strikes the obstacle near the pivotal shaft 9.

When the construction according to the invention is used, this effect will be avoided because in the event of such a collision the carrier of the cutting members, formed in this case at least substantially by the frame beam 17 and the hollow casing 19, can turn in a counter clockwise direction, as seen in FIG. 1, about the pivotal shaft 16 against the effect of the spring mechanism 29. Thus the inertia forces, which might otherwise bring about deformation of the frame beam 13, are absorbed by the spring mechanism 29, while kinetic energy of the abruptly retained mass, which could otherwise harm the second frame portion 11, is absorbed by the spring mechanism 29 and neutralised.

Although in the foregoing an agricultural implement in the form of a mower is illustrated, in which the working tools consist of cutting discs, it will be obvious that the construction according to the invention may as well be employed in other agricultural implements such as, for example, soil cultivating implements or hay-making implements.

As a matter of course, variations of the embodiment described above are possible within the spirit and scope of the invention. For example, as an alternative, a spring mechanism in the form of a torsional spring or the like arranged around a prolongation of the pivotal shaft 16 could also be used.

I claim:

1. An agricultural implement comprising a first frame portion having means thereon for coupling to a tractor or the like, said first frame portion being substantially horizontal and disposed substantially transverse to a direction of movement when the implement is in operation, a second frame portion having first and second ends and said first end pivotally connected to said first frame portion along a first vertical pivot shaft, means adjacent said first pivot shaft for permitting said second frame portion to deflect with respect to said first frame portion only when a force above a pre-determined magnitude is exerted on said second frame portion in a direction opposed to the direction of movement in operation of the implement, a carrier having working tools mounted thereon and pivotally connected by a second vertical pivot shaft to said second end of said frame portion, said second pivot shaft being spaced from said first pivot shaft in a direction away from said first frame portion, and a spring device between said carrier and said second frame portion extending a force such that an end portion of said carrier on a side of said second pivot shaft remote from said first frame portion can deflect in the direction of movement in operation.

2. An agricultural implement as claimed in claim 1 and further comprising means on said spring device for restraining pivoting of said carrier so that said end portion of the carrier can pivot from normal operational position only in the direction of movement of operation.

3. An agricultural implement as claimed in claim 1 wherein said spring device is connected between said end portion of the carrier and a coupling point located in a plane extended in the direction of movement in operation and passing through said second pivot shaft.

4. An agricultural implement as claimed in claim 3 wherein said spring device comprises a sleeve having one end connected to one of said carrier and said second frame portion, a rod slideably disposed within said sleeve and having an end thereof extending from said sleeve and connected to the other of said carrier and said second frame portion, a spring within said sleeve and acting against said rod, and a stop on said rod engageable with an end of said sleeve for limiting displacement of said rod under the action of said spring.

* * * * *